US012378922B1

(12) United States Patent
Fournier

(10) Patent No.: US 12,378,922 B1
(45) Date of Patent: Aug. 5, 2025

(54) BLENDING GASEOUS FUELS FOR ENERGY CONVERSION SYSTEMS

(71) Applicant: PWRTEK, LLC, Houston, TX (US)

(72) Inventor: Christopher Allan Fournier, Fort Worth, TX (US)

(73) Assignee: PWRTEK, LLC, Houston, TX (US)

( * ) Notice: Subject to any disclaimer, the term of this patent is extended or adjusted under 35 U.S.C. 154(b) by 0 days.

(21) Appl. No.: 18/658,348

(22) Filed: May 8, 2024

(51) Int. Cl.
*F02D 19/08* (2006.01)
*E21B 43/26* (2006.01)
*F02D 19/06* (2006.01)

(52) U.S. Cl.
CPC ........ *F02D 19/081* (2013.01); *E21B 43/2607* (2020.05); *F02D 19/0628* (2013.01); *F02D 2200/0611* (2013.01)

(58) Field of Classification Search
CPC ......... F02D 2200/0611; F02D 19/0628; F02D 19/081; E21B 43/2607
See application file for complete search history.

(56) References Cited

U.S. PATENT DOCUMENTS

| | | | | |
|---|---|---|---|---|
| 4,031,407 | A | 6/1977 | Reed | |
| 7,895,821 | B2 | 3/2011 | Annigeri et al. | |
| 8,381,506 | B2 | 2/2013 | Bhatnagar et al. | |
| 8,701,418 | B2 | 4/2014 | Venkataraman et al. | |
| 9,097,188 | B2 | 8/2015 | Tanabe et al. | |
| 9,133,779 | B2 | 9/2015 | Hughes | |
| 9,187,996 | B1 | 11/2015 | Nevison et al. | |
| 9,382,850 | B2 | 7/2016 | Menon et al. | |
| 11,359,474 | B1 | 6/2022 | Uhlmer | |
| 11,459,860 | B2 | 10/2022 | Archa | |
| 11,460,368 | B2 | 10/2022 | Yeung et al. | |
| 11,549,351 | B1 | 1/2023 | Fournier | |
| 11,686,188 | B1 | 6/2023 | Fournier | |
| 2011/0211193 | A1 * | 9/2011 | Saveliev | G01N 21/3504 356/436 |
| 2014/0311469 | A1 * | 10/2014 | Hughes | F02D 19/0634 123/577 |
| 2020/0181998 | A1 | 6/2020 | Ye et al. | |
| 2021/0156240 | A1 | 5/2021 | Cicci et al. | |
| 2021/0348476 | A1 | 11/2021 | Yeung et al. | |

OTHER PUBLICATIONS

"Application Note: Verax Field Gas Monitoring", JP3, accessed online at https://www.jp3.com/wp-content/uploads/2023/06/JP3-Measurement-Verax-Field-Gas-Application-Note.pdf, Jul. 30, 2023, 2 pages.

* cited by examiner

*Primary Examiner* — Kevin A Lathers
(74) *Attorney, Agent, or Firm* — Vorys, Sater, Seymour, and Pease LLP; Iona N. Kaiser

(57) ABSTRACT

In a general aspect, gaseous fuels are blended. In some cases, a fuel blending method includes receiving a flow of a first gaseous fuel in a first flow path of a fuel blending system and receiving a flow of a second gaseous fuel from a second fuel source in a second flow path of the fuel blending system. The heating value of the second gaseous fuel is lower than the heating value of the first gaseous fuel. The first and second gaseous fuels are combined from the first and second flow paths to form a blended gaseous fuel in a third flow path. A heating value of the blended gaseous fuel is measured, and the flow of the first gaseous fuel in the first flow path is adjusted to modify a content of blended gaseous fuel. The blended gaseous fuel can be provided, for example, to an energy conversion system.

20 Claims, 4 Drawing Sheets

BLENDING GASEOUS FUELS FOR ENERGY CONVERSION SYSTEMS

TECHNICAL FIELD

The following description relates blending gaseous fuels for energy conversion systems.

BACKGROUND

Fracture treatments have been used to stimulate the production of hydrocarbon resources from a subterranean formation. Fracture treatments typically introduce a pressurized fracturing fluid into the subterranean formation through a wellbore. The pressurized fracturing fluid can fracture the subterranean formation, and proppant material in the fracturing fluid can help stabilized the fractures.

DETAILED DESCRIPTION

Figure 1:
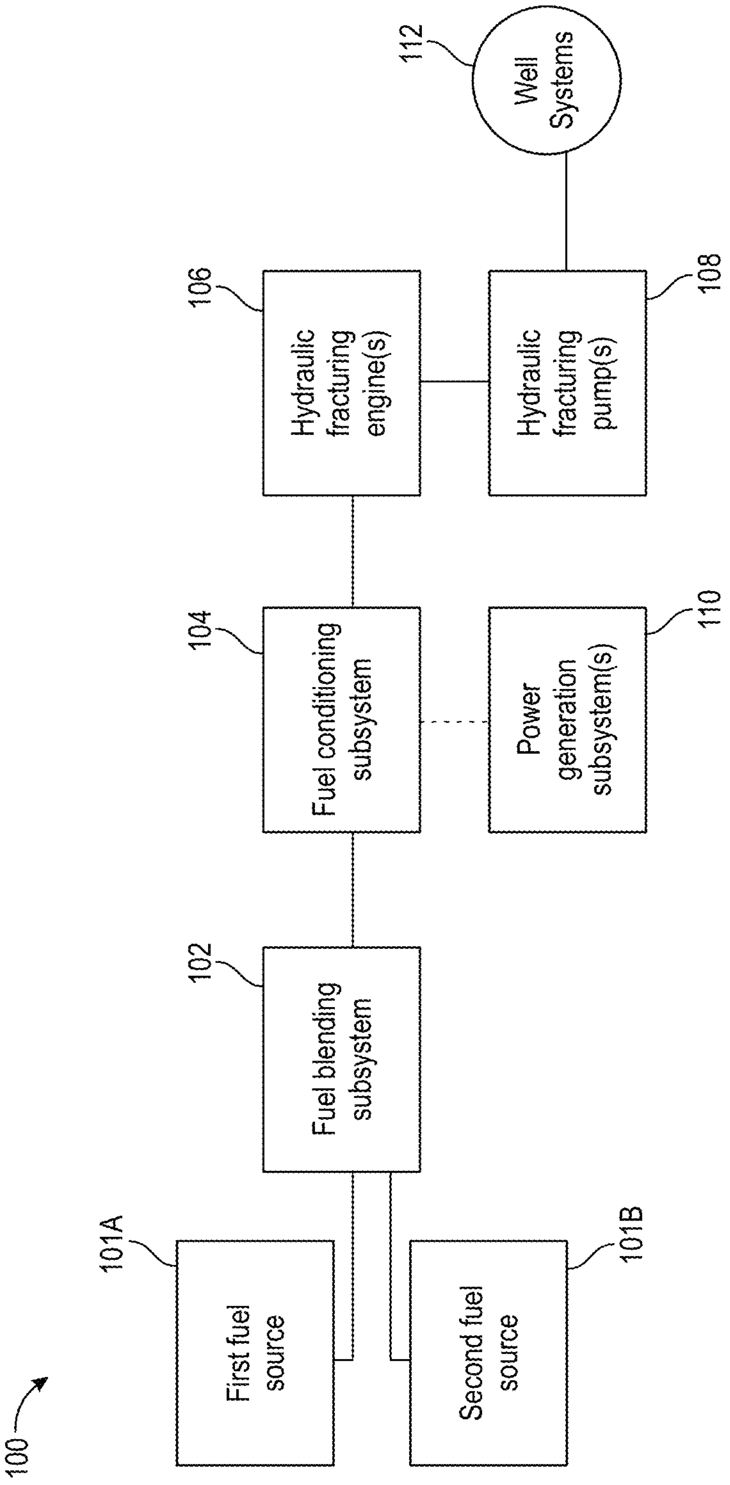
FIG. 1 is a block diagram showing aspects of an example hydraulic fracturing system.

In some aspects of what is described here, a fuel blending system blends gaseous fuels from multiple sources. In some instances, the fuel blending system characterizes the blended gaseous fuel (e.g., in real time during operation), modifies the content of the blended gaseous fuel to adjust its properties, and provides the blended gaseous fuel to downstream devices or processes. In some implementations, the fuel blending systems and techniques described here can be used to blend fuel for engines or power generation equipment in a hydraulic fracturing system that performs hydraulic fracture treatments. For instance, the blended fuel may be provided to a natural gas engine that drives a hydraulic fracturing pump, to a natural gas generator that drives an electric motor, or to another piece of equipment that runs on gaseous fuel.

The fuel blending systems and techniques described here can provide technical advantages and improvements over conventional systems in some cases. For example, the systems and techniques described here can improve combustion properties (e.g., improved stability and reduced emissions) and allow precise control over the energy content of the resulting blended gaseous fuel, for example, to match the specific energy requirements of energy conversion systems or energy conversion processes. In some instances, the resulting blended gaseous fuel can improve supply flexibility and cost efficiency, for example, when the fuel from one of the sources is less expensive or more readily available (for example, raw natural gas obtained from a wellbore onsite). Accordingly, in some implementations, hydraulic fracture treatments may be performed with greater fuel efficiency, which can reduce emissions and save costs. In some cases, a combination of these and potentially other advantages and improvements may be obtained.

Hydraulic fracture treatments can be used to stimulate the production of hydrocarbon resources (e.g., oil, natural gas, etc.) from subterranean rock formations. During a fracture treatment, fracture treatment fluids are pumped under high pressure into the subterranean rock formation through a wellbore to fracture the formation and increase permeability and production from the formation. The fracture treatment fluid may include a proppant material such as, for example, sand, glass beads, ceramic material, bauxite, dry powders, rock salt, benzoic acid, fiber material, cement plastics, or other materials. In many systems, proppant is mixed with other additive materials such as, for example, friction-reducing compounds and other types of additives.

Fracture treatment systems typically include pumps, engines, generators, or a combination of these and other types of mechanical or electro-mechanical equipment and energy conversion systems that are powered by gaseous fuel. In some cases, multiple gaseous fuel sources are available, and each fuel source provides a different character or quality of fuel. For instance, natural gas of distinct pressures and qualities may be available from different sources (e.g., compressed/processed natural gas, field (raw) gas, etc.). In some implementations, fuel blending systems can generate a blended fuel stream by combining fuel streams from multiple gaseous fuel sources. For instance, a lower quality gas stream (which may have a higher heating value) can be blended with a higher quality gas stream (which may have a lower heating value) to create a blended gas stream of acceptable quality (e.g., a quality specified for an engine or a turbine). In some cases, the fuel blending system can be trailer mounted to provide a mobile gas blending solution for utilizing natural gas of varying qualities and pressures for use in hydraulic fracturing engines and power generation equipment.

FIG. 1 is a block diagram showing aspects of an example hydraulic fracturing system 100. As shown in FIG. 1, the example hydraulic fracturing system 100 includes a fuel blending subsystem 102, a fuel conditioning subsystem 104, one or more hydraulic fracturing engines 106, one or more hydraulic fracturing pumps 108, and one or more power generation subsystems 110. In some instances, the example hydraulic fracturing system 100 may be used at a wellsite for performing a hydraulic fracturing process, and some components of the hydraulic fracturing system may be used at other locations.

The example hydraulic fracturing system 100 may include additional or different features, and the components of the example hydraulic fracturing system 100 may operate as described with respect to FIG. 1 or in another manner. For example, the example hydraulic fracturing system 100 may include a fracturing fluid blender and storage subsystem for preparing and storing fracturing fluid, a fracturing zone isolation subsystem to ensure the fracturing fluid is injected into a target reservoir zone, a wellhead control subsystem for controlling the rate and pressure of fluid injection during the fracturing process, a safety monitoring subsystem for monitoring real time data including temperature, pressure, seismic events, etc., and other subsystems for performing other functions. The various components and subsystems of the hydraulic fracturing system 100, which may include pipes, hoses, tubes, fluid tanks, pumps, valves, motors, mixers, generators, transformers, computer systems, or other types of structures and equipment, can be deployed on trucks, trailers, mobile vehicles, immobile installations, skids, etc.

In some implementations, the example hydraulic fracturing system 100 includes one or more control systems. The control systems can include one or more computing devices or systems associated with one or more of the components shown in FIG. 1, or the control systems may include computing devices or systems that are separate from the components shown in FIG. 1, for example, in a data van, at a remote data center or in the cloud. In some implementations, a control system can monitor and control the fracture treatment applied by the hydraulic fracturing system 100. The control system may receive data collected or generated by the hydraulic fracturing system 100, and the control system may process the data or otherwise use the data to select or modify operating parameters. For example, the control system may initiate control signals that configure or reconfigure components of the hydraulic fracturing system 100 or other equipment based on selected or modified properties.

The example hydraulic fracturing system 100 may also include communication links that allow various components and subsystems of the hydraulic fracturing system 100 to communicate with each other. For example, the hydraulic fracturing system 100 may include communication links that allow the control systems to communicate with one or more of the components and subsystems shown in FIG. 1. The communication links may also allow communication with sensors or data collection apparatus, remote systems, equipment installed in a wellbore, and other devices and equipment. The communication links may include any type of communication channels or networks, for example, to facilitate communication via wireless or a wired network, the Internet, a WiFi network, a satellite network, or another type of data communication network.

Figure 2:
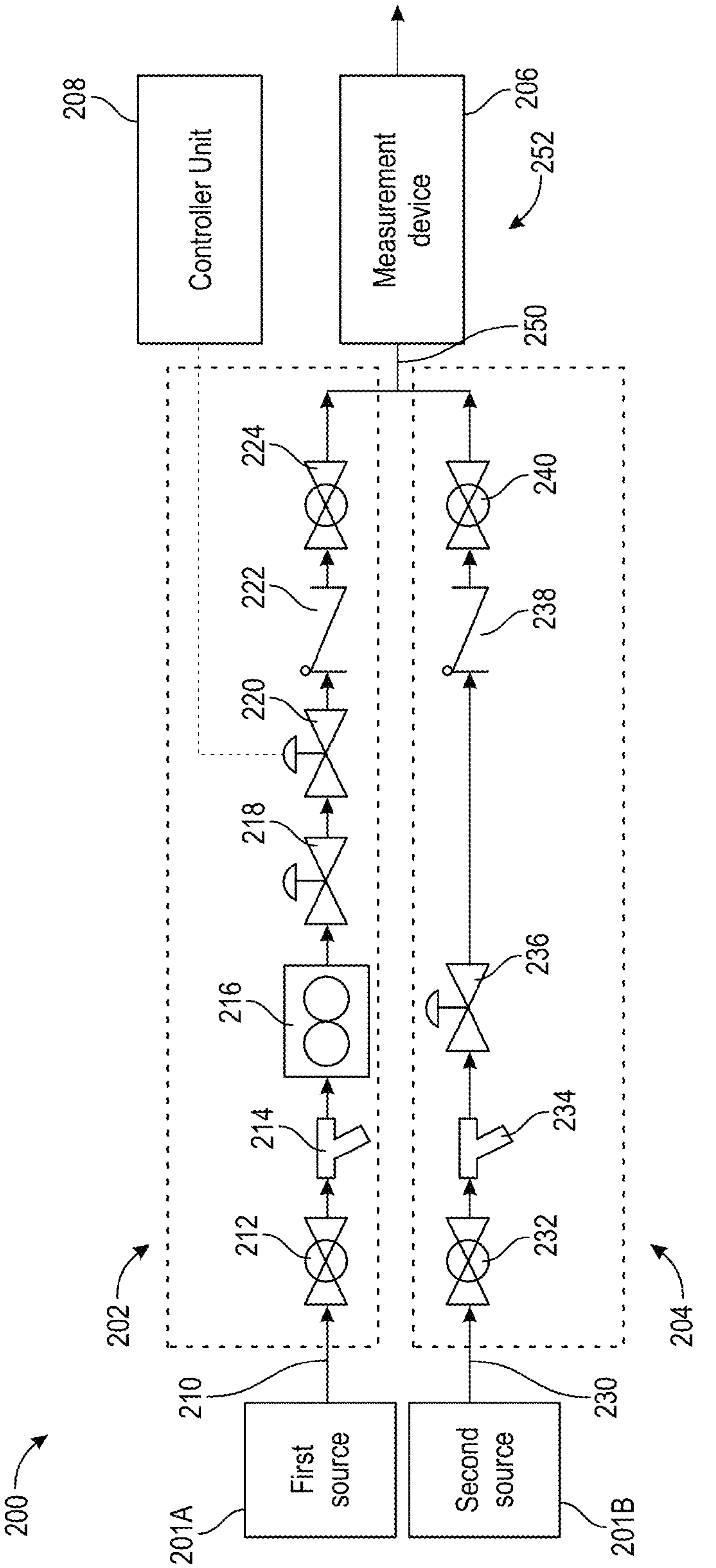
FIG. 2 is a schematic diagram showing aspects of an example fuel blending system.
Figure 3:
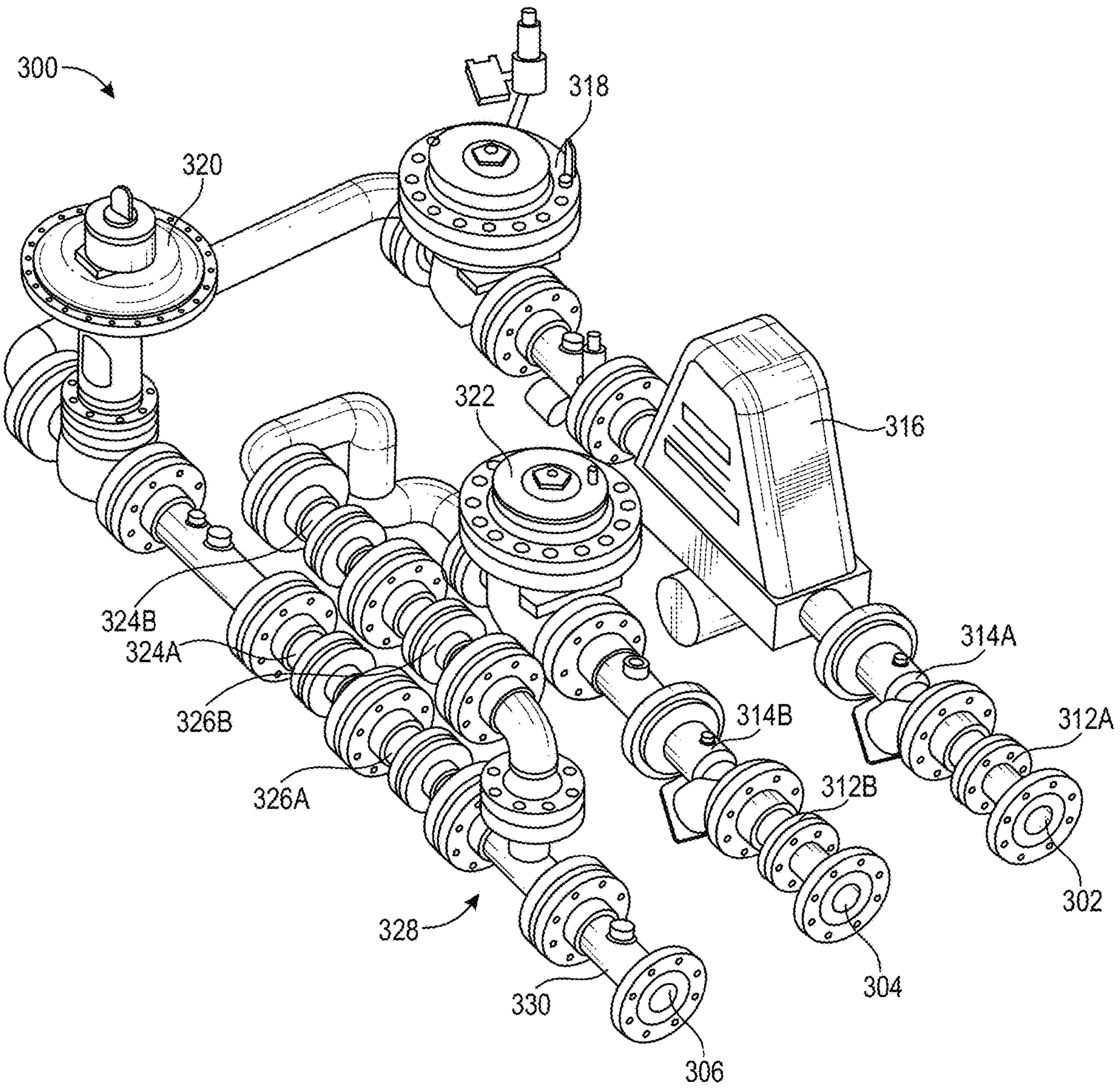
FIG. 3 is a diagram showing a perspective view of an example fuel blending system.

The example fuel blending subsystem 102 receives fuel from multiple fuel sources, blends the fuels, and provides a blended fuel flow to the fuel conditioning subsystem 104. In some instances, the fuel blending subsystem 102 can be implemented as the example fuel blending system as shown in FIGS. 2-3, or the fuel blending subsystem 102 may be implemented in another manner. In some instances, the fuel blending subsystem 102 can perform one or more of the operations in the example process 400 shown in FIG. 4, or the fuel blending subsystem 102 may operate in another manner.

In the example shown in FIG. 1, the fuel blending subsystem 102 receives input flows of gaseous fuels from two distinct fuel sources: a first fuel source 101A and a second fuel source 101B. A fuel blending subsystem may receive additional input flows of gaseous fuel from other fuel sources in some cases. The fuel blending subsystem 102 is configured to blend the flows of the two gaseous fuels to obtain a blended gaseous fuel, and to provide an output flow of the blended gaseous fuel for downstream devices and processes. In some instances, the fuel blending subsystem 102 modifies the content of the blended gaseous fuel, for instance, by modifying the content of the blended gaseous fuel. For example, the content of the blended gaseous fuel may be modified (e.g., by increasing or decreasing an input flow from one of the two fuel sources 101A, 101B) in real time based on measurements of the blended gaseous fuel during operation.

In some implementations, the first fuel source 101A includes a pipeline, a wellbore, or another fuel source that provides raw natural gas. The raw natural gas (also referred to as field gas or line gas) contains natural gas that has not been processed (e.g., by a gas processing plant) such as, for example, gas that was produced on-site (e.g., through the well systems 112 or otherwise). In some implementations, the second fuel source 101B includes a natural gas source storage system, a gas processing plant, a gas tank mounted on a truck, or another source that provides processed natural gas. The processed natural gas can be or include pure methane gas, such as compressed natural gas (CNG) or liquid natural gas (LNG). In some instances, the second gaseous fuel has a heating value that is lower than that of the first gaseous fuel. For instance, the first gaseous fuel may include raw natural gas, which may have a lower quality than processed natural gas from the second fuel source. In such cases, the output fuel generated by mixing fuel from both fuel sources has an intermediate quality and an intermediate heating value, which is between the heating values of the input fuels.

The example fuel conditioning subsystem 104 is configured to condition the blended gaseous fuel received from the fuel blending subsystem 102. For example, conditioning of the blended gaseous fuel may include cleaning (e.g., removing debris from) the blended gaseous fuel, regulating one or more properties (e.g., pressure, flow rate, temperature, composition) of the blended gaseous fuel, or a combination of these and other types of conditioning. In some cases, fuel is conditioned to prevent downstream devices and subsystems from being subjected to overpressure (e.g., a pressure that is above the operational pressure) or other issues. The blended gaseous fuel may be conditioned based on the properties of the blended gaseous fuel upstream from the fuel conditioning subsystem 104, the desired properties of the blended gaseous fuel downstream from the fuel conditioning subsystem 104 (e.g., the operating ranges of equipment), or both. In the example shown in FIG. 1, the hydraulic fracturing engine(s) 106 and the power generation subsystem(s) 110 are fueled by the conditioned gaseous fuel from the fuel conditioning subsystem 104.

The example hydraulic fracturing engine(s) 106 drive the hydraulic fracturing pump(s) 108 to inject fracturing fluid into a subterranean formation through the well system 112. During operation, the hydraulic fracturing engine(s) 106 consume gaseous fuel from the fuel conditioning subsystem 104. In some implementations, the hydraulic fracturing engine(s) 106 are natural gas engines. In some implementations, the hydraulic fracturing engine(s) 106 may include other types of engines that run on the gaseous fuel from the fuel conditioning subsystem 104. In some implementations, the hydraulic fracturing engine(s) 106 include dual fuel engines that can be powered by a combination of different types of fuels, such as diesel fuel and natural gas or another methane-based fuel.

The example power generation subsystem(s) 110 generate power that is used by other components of the hydraulic fracturing system 100. The power generation subsystem(s) 110 may include, for example, gas turbines, reciprocating engines, or other types of power generation devices. During operation, the power generation subsystem(s) 110 consume gaseous fuel from the fuel conditioning subsystem 104. In some examples, the power generation subsystem(s) 110 includes gas powered electrical generators that generate electrical power. The electrical power generated by the gas-powered electrical generators can be provided to electric motors or other electrically powered devices. The electric motors may drive pumps (e.g., the hydraulic fracturing pump(s) 108) or other equipment in the hydraulic fracturing system 100.

The example well systems 112 includes one or more wellbores in a subterranean region. Each of the well systems 112 may include one or more well heads and a well manifold that supplies fracture treatment fluid from the hydraulic fracturing pump(s) 108 to the one or more well heads, to be communicated into the respective wellbores. The well systems 112 may include any combination of horizontal, vertical, slant, curved, or other wellbore orientations. The subterranean region may include a rock formation that contains hydrocarbon resources, such as oil, natural gas, or others. For example, the subterranean region may include shale, coal, sandstone, granite, or others. The well systems 112 can communicate fracturing fluid into the subterranean region, for example, through conduits installed in the wellbores, to fracture or otherwise modify the rock formation. The conduits may include casing cement to the walls of the wellbore, or other types of conduits such as sectioned pipe or coiled tubing. In some implementations, all or a portion of the wellbores may be left open, without casing.

In some aspects of operation, during a hydraulic fracture treatment, the example hydraulic fracturing system 100 communicates facture treatment fluid into a subterranean region through the well systems 112. The hydraulic fracturing pumps 108 pressurize the fracturing treatment fluid from a fracture treatment source (e.g., one or more blender systems) for injection through the well systems 112. The hydraulic fracturing pumps 108 are driven by the hydraulic fracturing engines 106 or the power generation systems 110 (or both), which are fueled by the blended fuel that is produced by the fuel blending subsystem 102 and then conditioned by the fuel conditioning subsystem 104. During operation, the fuel blending subsystem 102 receives input fuels from the first and second fuel sources 101A, 101B and combines the input fuels to generate the blended fuel. During operation, the heating value of the blended fuel is measured, and the fuel blending subsystem 102 may modify the blended fuel content (e.g., by adjusting the flow of input fuels or otherwise) based on the measurement.

In the example shown in FIG. 1, the hydraulic fracturing system 100 includes one or more measurement devices that measures a heating value of the blended gaseous fuel during operation. For example, heating value measurement devices may be included in the fuel blending subsystem 102, the fuel conditioning subsystem 104 or other components. A heating value measurement device may be implemented, for instance, as a pipeline tap that measures the heating value of the blended gaseous fuel (e.g., in units of British thermal unit (BTU) or another unit of heating value). In some cases, the measurement device is an inline optical analyzer (e.g., that uses NIR laser absorption spectroscopy) that measures the heating value in real time. Such measurement devices allow the hydraulic fracturing system 100 to measure the heating value without requiring a gas chromatograph, and thereby reduce the sample time as compared to conventional gas chromatography, and the inline design may result in reduced emissions. (With a conventional gas chromatograph installation, gas is sampled in predetermined intervals, and the sampled gas is typically vented to the atmosphere.) In some instances, the fuel blending subsystem 102 adjusts the content of the blended fuel based on the heating value measurement.

FIG. 2 is a block diagram showing aspects of an example fuel blending system 200. In some instances, the fuel blending system 200 may be deployed in a hydraulic fracturing system, for example, as the fuel blending subsystem 102 shown in FIG. 1, or the fuel blending system 200 may be deployed in another type of system or environment (e.g., in a drilling environment, a production stage, etc.). The example fuel blending system 200 includes a first flow path 202, a second flow path 204, a measurement device 206, and a controller unit 208. The example fuel blending system 200 may be implemented as the example shown in FIG. 3 or in another manner. The example fuel blending system 200 may include additional or different features, and the components of the fuel blending system 200 may operate as described with respect to FIG. 2 or in another manner.

In certain instances, the fuel blending system 200 can be used to blend two gaseous fuels containing natural gas to obtain a blended gaseous fuel with desired properties. For example, the example fuel blending system 200 allows for blending a lower quality gaseous fuel (e.g., with a higher heating value) with a higher quality gaseous fuel (e.g., with a lower heating value relative to the lower quality gaseous fuel) to create a blended gaseous fuel with an acceptable quality. In some instances, the example fuel blending system 200 can be trailer mounted to provide a mobile gas blending solution for utilizing natural gas of varying qualities and pressures obtained onsite. The example fuel blending system 200 may be used to provide the blended gaseous fuel to power equipment of a hydraulic fracturing system, a drilling system, a compression system, or used in other energy conversion systems.

As shown in FIG. 2, the first flow path 202 includes a first inlet 210 for receiving a flow of a first gaseous fuel from a first fuel source 201A. In some instances, the first gaseous fuel includes raw natural gas. The first fuel source 201A may be a pipeline, a wellbore, or another fuel source. In some instances, the first gaseous fuel has a first heating value that is equal to or greater than 1300 British Thermal Unit per standard cubic feet (BTU/ft$^3$), in the range of 1200 to 1400 BTU/ft$^3$, or in another range. As shown in FIG. 2, the second flow path 204 includes a second inlet 230 for receiving a flow of a second gaseous fuel from a second fuel source 201B, which is distinct from the first fuel source 201A. In some implementations, the second gaseous fuel includes stored natural gas, e.g., compressed natural gas (CNG), liquid natural gas (LNG), or other processed gas. In some instances, the second gaseous fuel has a second heating value that is lower than that of the first gaseous fuel. For example, the second heating value may be less than or equal to 1000 BTU/ft$^3$ or in another range. The second fuel source 201B can be a natural gas storage system, or another source.

In some implementations, the first flow path 202 further includes a first inlet isolation valve 212 connected to the first inlet 210, a first strainer 214 connected to the first inlet isolation valve 212, a gas meter 216 connected to the first strainer 214, a first pressure control valve 218 connected to the gas meter 216, a flow control valve 220 connected to the first pressure control valve 218, a first check valve 222 connected to the flow control valve 220, and a first outlet isolation valve 224 connected to the first check valve 222. In some implementations, the second flow path 204 further includes a second inlet isolation valve 232 connected to the second inlet 230, a second strainer 234 connected to the second inlet isolation valve 232, a second pressure control valve 236 connected to the second strainer 234, a second check valve 238 connected to the second pressure control valve 236, and a second outlet isolation valve 240 connected to the second check valve 238. The flow paths may include additional or different components and features, and the elements of the flow paths may be arranged as shown or in another manner.

In some instances, the first and second inlet isolation valves 212, 232 are connected to the respective first and second inlets 210, 230 for receiving the flows of the first and second gaseous fuels. In certain instances, each of the first and second inlet isolation valves 212, 232 may be an actuated ball valve. Each of the first and second inlet isolation valves 212, 232 may be configured to actuate between a first (e.g., open) position and a second (e.g., closed) position. In the open position, the flows of the first and second gaseous fuels are permitted to flow downstream through the first and second inlet isolation valves 212, 232

(to the right in FIG. 2); and in the closed position, the first and second gaseous fuels are prevented from flowing downstream through the first and second inlet isolation valves 212, 232.

As shown in FIG. 2, each of the first and second strainers 214, 234 connected to the respective first and second inlet isolation valves 212, 214. The first and second strainers 214, 234 may be implemented as Y-strainers or other types of strainers. In some implementations, the first and second strainers 214, 234 are configured to remove debris (e.g., particles) from the respective first and second gaseous fuels, which may prevent damage to the downstream pressure control valves 218, 236, and/or other components/equipment in the example fuel blending system 200. In some implementations, the gas meter 216 connected to and located downstream from the first strainer 214 is configured to measure one or more of the properties (e.g., the pressure and/or flow rate) of the first gaseous fuel flowing through the first flow path.

In some instances, the first and second pressure control valves 218, 236 include pressure regulators which are configured to control and reduce the pressure of the first and second gaseous fuels. In some instances, pressure values of the first and second pressure control valves 218, 236 may be configured at the beginning of the job and remain constant. In some implementations, the second pressure control valve 236 on the second flow path 204 operates at a lower pressure value than that at which the first pressure control valve 218 operates on first flow path 202. For example, the pressure value at the outlet port of the first pressure control valve 218 can be around 140 PSIG (pounds per square inch gauge relative to the atmospheric pressure); and the pressure value at the outlet port of the second pressure control valve 236 can be around 130 PSIG. In some instances, the pressure values at the outlet port of the first and second pressure control valves 218, 236 may have different values.

In the example shown in FIG. 2, the flow control valve 220 is configured to control the flow rate of the first gaseous fuel in the first flow path. The flow control valve 220 may control the flow rate based on control signals, for example, control signals received from the controller unit 208. In some instances, the flow control valve 220 may be implemented as a ball valve, a gate valve, a plug valve, a diaphragm valve, or another type of flow control valve. When the flow control valve 220 on the first flow path 202 is in the open position, the flow on the second flow path 204 is zero. In some implementations, the total flow rate of first and second gaseous fuels through the example fuel blending system 200 remains constant according to the downstream demand. Adjusting the flow control valve 220 results in the adjustment of the percentage of the first gaseous fuel in the downstream blended gaseous fuel without affecting the total flow rate.

In some implementations, the first and second check valves 222, 238 are configured to permit the respective first and second gaseous fuels to flow downstream therethrough and to prevent gas (or any other fluid) from flowing upstream therethrough.

In certain instances, the first and second outlet isolation valves 224, 240 may be implemented as the first and second inlet isolation valves 212, 232, e.g., as actuated ball valves. The first and second outlet isolation valves 224, 240 may be configured to actuate between a first (e.g., open) position and a second (e.g., closed) position. In the open position, the first and second gaseous fuels are permitted to flow downstream through the first and second outlet isolation valves 224, 240 (to the outlet 250 in FIG. 2); and in the closed position, the first and second gaseous fuels are prevented from flowing downstream through the first and second outlet isolation valves 224, 240.

As shown in FIG. 2, the example fuel blending system 200 includes an outlet 250 that is connected to, and positioned downstream from, the first and second outlet isolation valves 224, 240. The outlet 250 is configured to discharge the blended gaseous fuel to downstream equipment and processes. For example, the outlet 250 may be configured to connect to the fuel conditioning subsystem 104, and further to a fuel inlet of the hydraulic fracturing engine 106 or a fuel inlet of the power generation subsystem 110, or a fuel inlet of other energy conversion systems.

In some implementations, the measurement device 206 includes a Near-Infrared (NIR) laser absorption measurement device which is configured to measure the heating value of the blended gaseous fuel discharged from the outlet 250 in real time while adjusting the flow of the first gaseous fuel in the first flow path 202. The measurement device 206 communicates readout signals to the controller unit 208 through a communication link. In some instances, the measurement device 208 may also receive control signals from the controller unit 208 for performing calibration and measurement. In some instances, the measurement device 206 may be part of the fuel blending system 200; or may be configured on another system different from the fuel blending system 200. For example, the measurement device 206 may be located in the fuel conditioning subsystem 104 or in other systems.

In some implementations, the controller unit 208 is configured to receive the readout signals from the measurement device 206; to determine the heating value of the blended gaseous fuel; and to detect a difference between the heating value with a setpoint heating value (e.g., 1100 BTU/$ft^3$ or another setpoint value). In some implementations, the setpoint heating value corresponds to a specification of the energy conversion system, e.g., a heating value (or range of heating values) required by a natural gas-powered engine. In response to the measured heating value of the blended gaseous fuel at the outlet 250 being different from the setpoint heating value, the controller unit 208 communicates a control signal to the flow control valve 220 in the first flow path 202 to tune the flow rate of the first gaseous fuel between the first inlet 210 and the outlet 250. The control signal from the controller unit 208 received at the flow control valve 220 can adjust the flow of the first gaseous fuel based on the detected differences between the measured heating value and the setpoint heating value to modify a content of the blended gaseous fuel at the outlet 250 connected to a third flow path 252 of the fuel blending system 200 by modifying the ratio of the first and second gaseous fuels in the blended gaseous fuel and causing a heating value of the blended gaseous fuel to be closer to the setpoint heating value. In particular, when the measured heating value is greater than the setpoint heating value, the control signal can decrease the opening of the flow control valve 220 and reduce the flow rate of the first gaseous fuel. Similarly, when the measured heating value is less than the setpoint heating value, the control signal from the controller unit 208 received at the flow control valve 220 can increase the opening of the flow control valve 220 and increase the flow rate of the first gaseous fuel. The blended gaseous fuel having the modified content can be provided to the energy conversion system during a hydraulic fracture treatment. For instance, a hydraulic fracturing engine may be fueled with the blended gaseous fuel and a hydraulic fracturing pump (e.g., the hydraulic fracturing pump 108) may be driven by the hydraulic fracturing engine (e.g., the hydraulic fracturing engine 106).

In some instances, the controller unit 208 includes one or more programmable processors for executing one or more computer programs to perform actions by operating on input data and generating output. The processes and logic flows can also be performed by, and the controller unit 208 may include special purpose logic circuitry, e.g., an FPGA (field programmable gate array) or an ASIC (application specific integrated circuit). In some instances, the controller unit 208 may include processors suitable for the execution of a computer program including both general and special purpose microprocessors, and processors of any kind of digital computer. The controller unit 208 includes one or more memory units including a read-only memory or a random-access memory or both that store the instructions and data. The processor of the controller unit 208 can receive the instructions and data from the one or more memory units. In certain instances, the control unit 208 may include interfaces, a display, or other components.

In some instances, the controller unit 208 and the flow control devices on each of the flow paths are configured to utilize a maximum amount of low-quality fuel (e.g., raw natural gas), and to utilize a minimum amount of high-quality fuel (e.g., processed natural gas). For instance, the controller unit 208 can be programmed to operate the flow control valve 220 as a throttle, to find a setting that maximizes the contribution of low-quality fuel while achieving the setpoint heating value. Accordingly, the pressure control value 218 on the first flow path can be set to a higher pressure than the pressure control valve 236 on the second flow path.

FIG. 3 is a diagram showing aspects of an example fuel blending system 300. In some instances, the fuel blending system 300 may be deployed in a hydraulic fracturing system, for example, as the fuel blending subsystem 102 shown in FIG. 1, or the fuel blending system 300 may be deployed in another type of system or environment (e.g., in a drilling environment, a production stage, etc.). The example fuel blending system 300 may include additional or different features, and the components of the fuel blending system 300 may operate as described with respect to FIG. 3 or in another manner.

As shown in FIG. 3, the example fuel blending system 300 includes a first inlet 302 for receiving a flow of a first gaseous fuel from a first fuel source, a first inlet isolation valve 312A connected to the first inlet 302, a first strainer 314A connected to the first inlet isolation valve 312A, a gas meter 316 connected to the first strainer 314A, a first pressure control valve 318 connected to the gas meter 316, a flow control valve 320 connected to the first pressure control valve 318, a first check valve 324A connected to the flow control valve 320, and a first outlet isolation valve 326A. The example gas blending system 300 further includes a second let 304 for receiving a flow of a second gaseous fuel from a second distinct fuel source, a second inlet isolation valve 312B, a second strainer 314B, a second pressure control valve 322, a second check valve 324B, and the second outlet isolation valve 326B. The first and second gaseous fuels meet at a fork connection 328 connected to a conduit 330. The example gas blending system 300 further includes an outlet 306 connected to the conduit 330. The components in the example gas blending system 300 may be implemented as described with respect to the example gas blending system 200 as shown in FIG. 2 or in another manner. In some instances, the example gas blending system 300 may be operated to perform operations in the example process 400 FIG. 4 or in another manner.

In some implementations, a flow of a blended gaseous fuel is formed in the conduit 330 where the flows of the first and second gaseous fuels from the first and second inlet 302, 304 are combined. In some implementations, the flow control valve 320 can be controlled by a controller unit (e.g., the controller unit 208 in FIG. 2) to modify a flow rate of the first gaseous fuel in a flow path between the first inlet 302 and the conduit 330. In some instances, the outlet 306 is connected to a measurement device that measures the heating value of the blended gaseous fuel formed in the conduit 330. The controller unit communicates with the measurement device to detect a difference between the measured heating value and a setpoint heating value. The controller unit communicates with the flow control valve 320 to adjust the flow control valve 320 based on the detected difference. For example, the flow control valve 320 can increase the flow rate of the first gaseous fuel in the flow path in response to a measured heating value in the blended gaseous fuel from the third conduit 330 being less than a setpoint heating value; and the flow control valve 320 can decrease the flow rate of the first gaseous fuel in the flow path in response to the measured heating value in the blended gaseous fuel from the third conduit 330 being greater than the setpoint heating value.

Figure 4:
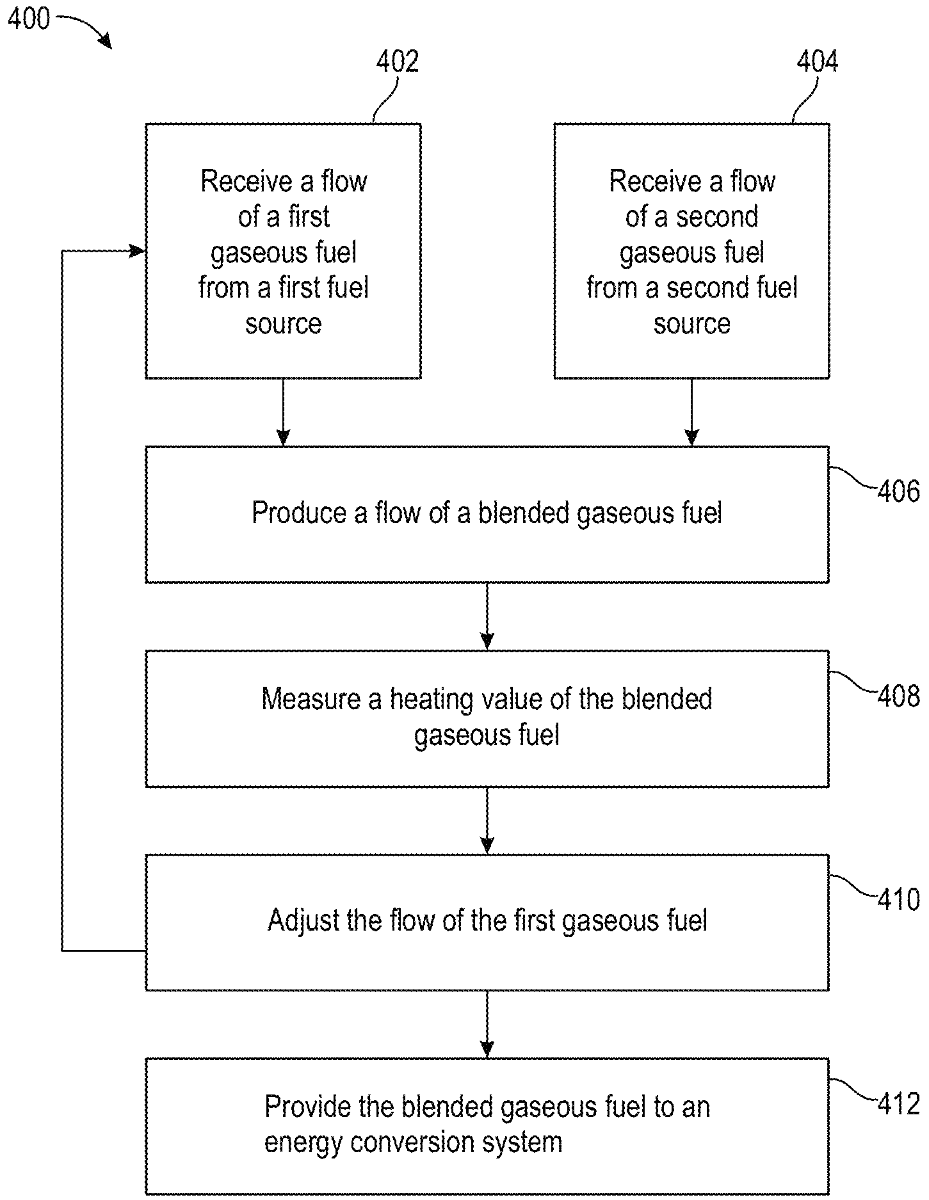
FIG. 4 is a flow chart showing aspects of an example process of blending gaseous fuels.

FIG. 4 is a flow chart showing aspects of an example process 400 for blending gaseous fuels. The example process 400 can be used, for example, to operate a fuel blending system, e.g., the example fuel blending subsystem 102 in FIG. 1 or the example fuel blending systems 200, 300 in FIGS. 2 and 3. For instance, the example process 400 can be used to blend two gaseous fuels from distinct fuel sources to obtain a blended gaseous fuel with a desired property to power a hydraulic fracturing engine, a power generator device, or another energy conversion system. The example process 400 may include additional or different operations, including operations performed by additional or different components, and the operations may be performed in the order shown or in another order. In some implementations, one or more operations in the example process 400 can be performed by a computer system, for instance, by a digital computer system having one or more digital processors (e.g., the controller unit 208 in FIG. 2) that execute instructions (e.g., instructions stored in the memory unit of the controller unit 208).

At 402, a flow of a first gaseous fuel is received. In some implementations, the first gaseous fuel is received at a first inlet of the fuel blending system (e.g., the first inlet 210, 302 of the gas blending system 200, 300 in FIGS. 2-3) from a first fuel source. In some instances, the first gaseous fuel has a low quality. For example, the first gaseous fuel may include raw natural gas from a pipeline, directly from the wellbore, or another fuel source. In some instances, the first gaseous fuel has a first heating value equal to or greater than 1300 British Thermal Unit per standard cubic feet (BTU/$ft^3$) or in another range.

At 404, a flow of a second gaseous fuel is received. In some implementations, the second gaseous fuel is received at a second inlet of the gas blending system (e.g., the second inlet 230, 304 of the gas blending system 200, 300 in FIGS. 2-3) from a second fuel source, which is distinct from the first fuel source. In some implementations, the second gaseous fuel includes stored natural gas from a natural gas source storage system, or another fuel source. In some instances, the second gaseous fuel includes compressed natural gas (CNG), liquid natural gas (LNG), or other processed gaseous fuels. In some instances, the second gaseous fuel has a second heating value (e.g., less than or equal to 1000 BTU/$ft^3$ or in another range) lower than that of the first gaseous fuel.

At 406, a flow of a blended gaseous fuel is produced. As shown in FIG. 3, the first gaseous fuel from the first inlet 302 and the second gaseous fuel from the second inlet 304, after flowing through separate flow paths, meet at the fork junction 328, and the first and second gaseous fuels are combined to produce the blended gaseous fuel in the conduit 330 connected to the outlet 306. The blended gaseous fuel includes a combination of the first and second gaseous fuels from the first and second fuel sources.

At 408, a heating value of the blended gaseous fuel is measured. The heating value of the blended gaseous fuel at the outlet 306 is measured in real time. In some instances, the measurement of the heating value of the blended gaseous fuel is performed using a Near-Infrared (NIR) laser absorption measurement device, or other types of measuring devices. In some instances, the heating value of the blended gaseous fuel is measured (e.g., constantly, periodically, or at designated times) and monitored in real time while the content of the blended gaseous fuel is modified (e.g., during the operation 410).

At 410, the flow of the first gaseous fuel is adjusted. By operation of the controller unit 208, the measured heating value of the blended gaseous fuel is compared with a setpoint heating value (which may encompass a range of values). The setpoint heating value may be specified by the system operator according to parameters of the downstream device that consumes the blended gaseous fuel, e.g., the hydraulic fracturing engine, a turbine, or other energy conversion systems. In response to the measured heating value of the blended gaseous fuel being different from the setpoint heating value, the flow of the first gaseous fuel between the first inlet 302 and the conduit 330 is adjusted by controlling the flow control valve 320. In particular, in response to the measured heating value being less than the setpoint heating value, the flow of the first gaseous fuel is increased; or in response to the measured heating value being greater than the setpoint heating value, the flow of the first gaseous fuel is decreased. In some instances, the setpoint heating value is a range between a minimum setpoint heating value and a maximum setpoint heating value. In this case, in response to the measured heating value being less than the minimum setpoint heating value, the flow of the first gaseous fuel is increased; or in response to the measured heating value being greater than the maximum setpoint heating value, the flow of the first gaseous fuel is decreased.

The operations 402, 404, 406, 408, 410 may be iteratively executed. In certain instances, the adjustment (at 410) can be paused, modified, suspended, or terminated. For instance, the adjustment (at 410) can be suspended in response to the measured heating value matching the setpoint heating value, in response to the absolute value of the difference between the measured heating value and the setpoint heating value being less than a predetermined threshold value, in response to the measured heating value falling within the range between the minimum setpoint heating value and the maximum setpoint heating value, or in response to another condition being satisfied.

As shown in FIG. 4, the example process 400 continues with operation 412 during which the blended gaseous fuel can be provided to an energy conversion system, e.g., the hydraulic fracturing engine to drive a hydraulic fracturing pump during a hydraulic fracturing treatment process or other energy conversion systems in other processes. In some instances, prior to providing the blended gaseous fuel to the inlet of the energy conversion system, the blended gaseous fuel can be conditioned (e.g., by operation of the fuel conditioning subsystem 104 in FIG. 1), for example by adjusting the pressure of the blended gaseous fuel, removing the debris, or performing other functions.

In a general aspect, a fuel blending system blends fuels from distinct fuel sources.

In a first example, a fuel blending method includes in a first flow path of a fuel blending system, receiving a flow of a first gaseous fuel from a first fuel source, the first gaseous fuel having a first heating value; in a second flow path of the fuel blending system, receiving a flow of a second gaseous fuel from a second, distinct fuel source, the second gaseous fuel having a second heating value that is lower than the first heating value; combining the first and second gaseous fuels from the first and second flow paths to form a flow of a blended gaseous fuel in a third flow path of the fuel blending system; measuring a heating value of the blended gaseous fuel; based on the measured heating value of the blended gaseous fuel, adjusting the flow of the first gaseous fuel in the first flow path to modify a content of blended gaseous fuel being formed in the third flow path; and providing the blended gaseous fuel to an energy conversion system.

Implementations of the first example may include one or more of the following features. The method includes by operation of a control system detecting a difference between the measured heating value of the blended gaseous fuel and a setpoint heating value; and adjusting the flow of the first gaseous fuel in the first flow path based on the detected difference. Adjusting the flow of the first gaseous fuel in the first flow path includes adjusting a flow rate of the first gaseous fuel in the first flow path. Adjusting the flow of the first gaseous fuel in the first flow path modifies a ratio of the first and second gaseous fuels in the blended gaseous fuel, causing a heating value of the blended gaseous fuel to be closer to the setpoint heating value. Adjusting the flow of the first gaseous fuel in the first flow path includes increasing a flow rate of the first gaseous fuel in response to the measured heating value being less than the setpoint heating value or decreasing the flow rate of the first gaseous fuel in response to the measured heating value being greater than the setpoint heating value.

Implementations of the first example may include one or more of the following features. The blended gaseous fuel having the modified content has a heating value that is within a predetermined threshold of the setpoint heating value, and the setpoint heating value corresponds to a specification of the energy conversion system. The first gaseous fuel includes raw natural gas from a pipeline, the second gaseous fuel includes stored natural gas from a natural gas source storage system, and the energy conversion system includes a natural gas-powered engine. The measurement device includes a Near-Infrared (NIR) laser absorption measurement device, and the method includes measuring the heating value of the blended gaseous fuel in real time while adjusting the flow of the first gaseous fuel in the first flow path.

Implementations of the first example may include one or more of the following features. The method further includes conditioning the blended gaseous fuel between the third flow path of the fuel blending system and a fuel inlet of the energy conversion system. The energy conversion system includes a hydraulic fracturing engine, the blended gaseous fuel having the modified content is provided to the energy conversion system during a hydraulic fracture treatment, and the method includes fueling the hydraulic fracturing engine with the blended gaseous fuel; and driving a hydraulic fracturing with the hydraulic fracturing engine.

In a second example, a system includes a first inlet that receives a flow of a first gaseous fuel from a first fuel source, the first gaseous fuel having a first heating value; a second inlet that receives a flow of a second gaseous fuel from a second, distinct fuel source, the second gaseous fuel having a second heating value that is lower than the first heating value; a conduit configured to form a flow of a blended gaseous fuel based on the first and second gaseous fuels; a flow control device that controls the flow of the first gaseous fuel between the first inlet and the conduit; a measurement device that measures a heating value of the blended gaseous fuel; a controller unit configured to adjust the flow control device based on the measured heating value, wherein adjusting the flow control device modifies a content of the blended gaseous fuel formed in the conduit; and an outlet that provides the blended gaseous fuel to an energy conversion system.

Implementations of the second example may include one or more of the following features. The controller unit is configured to detect a difference between the measured heating value and a setpoint heating value; and adjust the flow control device based on the detected difference. Adjusting the flow control device modifies a flow rate of the first gaseous fuel in a flow path between the first inlet and the conduit, wherein the controller unit is configured to cause the flow control device to increase the flow rate of the first gaseous fuel in the flow path in response to the measured heating value being less than the setpoint heating value and cause the flow control device to decrease the flow rate of the first gaseous fuel in the flow path in response to the measured heating value being greater than the setpoint heating value.

Implementations of the second example may include one or more of the following features. The system includes the energy conversion system; and the setpoint heating value corresponds to a specification of the energy conversion system. The first gaseous fuel includes raw natural gas from a pipeline, the second gaseous fuel includes stored natural gas from a natural gas source storage system, and the energy conversion system includes a natural gas-powered engine. The system includes a fuel gas conditioning system that conditions the blended gaseous fuel between the outlet and the energy conversion system.

Implementations of the second example may include one or more of the following features. The measurement device includes a Near-Infrared (NIR) laser absorption measurement device configured to measure the heating value of the blended gaseous fuel in real time while adjusting the flow control device. The system includes the energy conversion system which includes a hydraulic fracturing engine; and a hydraulic fracturing pump that is driven by the hydraulic fracturing engine.

In a third example, a hydraulic fracturing system includes a first fuel source that provides a first gaseous fuel having a first heating value; a second fuel source that provides a second gaseous fuel having a second heating value that is lower than the first heating value; means for blending the first gaseous fuel and the second gaseous fuel, wherein the means for blending produces a blended gaseous fuel; a hydraulic fracturing engine powered by the blended gaseous fuel; and a hydraulic fracturing pump driven by the hydraulic fracturing engine.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A fuel blending method comprising:

in a first flow path of a fuel blending system, receiving a flow of a first gaseous fuel from a first fuel source, the first gaseous fuel having a first heating value;

in a second flow path of the fuel blending system, receiving a flow of a second gaseous fuel from a second, distinct fuel source, the second gaseous fuel having a second heating value that is lower than the first heating value;

combining the first and second gaseous fuels from the first and second flow paths to form a flow of a blended gaseous fuel in a third flow path of the fuel blending system;

measuring a heating value of the blended gaseous fuel along the third flow path;

based on the measured heating value of the blended gaseous fuel, adjusting the flow of the first gaseous fuel in the first flow path, wherein adjusting the flow of the first gaseous fuel in the first flow path modifies a content of the blended gaseous fuel being formed in the third flow path; and providing the blended gaseous fuel to an energy conversion system.

2. The method of claim 1, comprising, by operation of a control system:

detecting a difference between the measured heating value of the blended gaseous fuel and a setpoint heating value; and adjusting the flow of the first gaseous fuel in the first flow path based on the detected difference.

3. The method of claim 2, wherein adjusting the flow of the first gaseous fuel in the first flow path comprises adjusting a flow rate of the first gaseous fuel in the first flow path.

4. The method of claim 2, wherein adjusting the flow of the first gaseous fuel in the first flow path modifies a ratio of the first and second gaseous fuels in the blended gaseous fuel, which causes a heating value of the blended gaseous fuel to be closer to the setpoint heating value.

5. The method of claim 2, wherein adjusting the flow of the first gaseous fuel in the first flow path comprises:

increasing a flow rate of the first gaseous fuel in response to the measured heating value being less than the setpoint heating value, or decreasing the flow rate of the first gaseous fuel in response to the measured heating value being greater than the setpoint heating value.

6. The method of claim 2, wherein the blended gaseous fuel having the modified content has a heating value that is within a predetermined threshold of the setpoint heating value, and the setpoint heating value corresponds to a specification of the energy conversion system.

7. The method of claim 6, wherein the first gaseous fuel comprises raw natural gas from a pipeline, the second gaseous fuel comprises stored natural gas from a natural gas source storage system, and the energy conversion system comprises a natural gas-powered engine.

8. The method of claim 1, wherein measuring the heating value of the blended gaseous fuel is performed by operation of a Near-Infrared (NIR) laser absorption measurement device, and the method comprises measuring the heating value of the blended gaseous fuel in real time while adjusting the flow of the first gaseous fuel in the first flow path.

9. The method of claim 1, comprising conditioning the blended gaseous fuel between the third flow path of the fuel blending system and a fuel inlet of the energy conversion system.

10. The method of claim 1, wherein the energy conversion system comprises a hydraulic fracturing engine, the blended gaseous fuel having the modified content is provided to the energy conversion system during a hydraulic fracture treatment, and the method comprises:

fueling the hydraulic fracturing engine with the blended gaseous fuel; and driving a hydraulic fracturing pump with the hydraulic fracturing engine.

11. A system comprising:

a first inlet that receives a flow of a first gaseous fuel from a first fuel source, the first gaseous fuel having a first heating value;

a second inlet that receives a flow of a second gaseous fuel from a second, distinct fuel source, the second gaseous fuel having a second heating value that is lower than the first heating value;

a conduit configured to form a flow of a blended gaseous fuel based on the first and second gaseous fuels;

a flow control device that controls the flow of the first gaseous fuel between the first inlet and the conduit;

a measurement device that measures a heating value of the blended gaseous fuel formed in the conduit;

a controller unit configured to adjust the flow control device based on the measured heating value, wherein adjusting the flow control device modifies a content of the blended gaseous fuel formed in the conduit; and an outlet that provides the blended gaseous fuel to an energy conversion system.

12. The system of claim 11, wherein the controller unit is configured to:

detect a difference between the measured heating value and a setpoint heating value; and adjust the flow control device based on the detected difference.

13. The system of claim 12, wherein adjusting the flow control device modifies a flow rate of the first gaseous fuel in a flow path between the first inlet and the conduit.

14. The system of claim 13, wherein the controller unit is configured to:

cause the flow control device to increase the flow rate of the first gaseous fuel in the flow path in response to the measured heating value being less than the setpoint heating value, and cause the flow control device to decrease the flow rate of the first gaseous fuel in the flow path in response to the measured heating value being greater than the setpoint heating value.

15. The system of claim 12, comprising the energy conversion system, wherein the setpoint heating value corresponds to a specification of the energy conversion system.

16. The system of claim 15, wherein the first gaseous fuel comprises raw natural gas from a pipeline, the second gaseous fuel comprises stored natural gas from a natural gas source storage system, and the energy conversion system comprises a natural gas-powered engine.

17. The system of claim 11, wherein the measurement device comprises a Near-Infrared (NIR) laser absorption measurement device configured to measure the heating value of the blended gaseous fuel in real time while adjusting the flow control device.

18. The system of claim 11, comprising a fuel conditioning system that conditions the blended gaseous fuel between the outlet and the energy conversion system.

19. The system of claim 11, comprising:

the energy conversion system, wherein the energy conversion system comprises a hydraulic fracturing engine; and a hydraulic fracturing pump that is driven by the hydraulic fracturing engine.

20. A hydraulic fracturing system comprising:

a first fuel source that provides a first gaseous fuel having a first heating value;

a second fuel source that provides a second gaseous fuel having a second heating value that is lower than the first heating value;

means for blending the first gaseous fuel and the second gaseous fuel, wherein the means for blending produces a blended gaseous fuel;

a measurement device that measures a heating value of the blended gaseous fuel produced by the means for blending;

a hydraulic fracturing engine powered by the blended gaseous fuel; and a hydraulic fracturing pump driven by the hydraulic fracturing engine.

* * * * *